US011889255B2

(12) United States Patent
Li

(10) Patent No.: US 11,889,255 B2
(45) Date of Patent: Jan. 30, 2024

(54) COMMUNICATION METHOD BETWEEN EARPHONES AND CHARGING BOX, CHARGING BOX, EARPHONES AND READABLE STORAGE MEDIUM

(71) Applicant: GOERTEK INC., Shandong (CN)

(72) Inventor: Tao Li, Shandong (CN)

(73) Assignee: GOERTEK, INC., Shandong (CN)

( * ) Notice: Subject to any disclaimer, the term of this patent is extended or adjusted under 35 U.S.C. 154(b) by 0 days.

(21) Appl. No.: 17/997,304

(22) PCT Filed: Oct. 29, 2020

(86) PCT No.: PCT/CN2020/124861
§ 371 (c)(1),
(2) Date: Oct. 27, 2022

(87) PCT Pub. No.: WO2021/232681
PCT Pub. Date: Nov. 25, 2021

(65) Prior Publication Data
US 2023/0179903 A1 Jun. 8, 2023

(30) Foreign Application Priority Data
May 19, 2020 (CN) .......................... 202010428657.3

(51) Int. Cl.
*H04R 1/10* (2006.01)
*H04L 47/50* (2022.01)
(52) U.S. Cl.
CPC ........... *H04R 1/1041* (2013.01); *H04L 47/50* (2013.01); *H04R 1/1025* (2013.01); *H04R 2420/07* (2013.01)

(58) Field of Classification Search
CPC ................ H04R 1/1041; H04R 1/1025; H04R 2420/07; H04R 1/10; H04L 47/50;
(Continued)

(56) References Cited

U.S. PATENT DOCUMENTS

2014/0149805 A1* 5/2014 Michihata ........... G06F 13/4282
714/48
2021/0313810 A1* 10/2021 Townsend ................. H02J 1/06

FOREIGN PATENT DOCUMENTS

CN 108429979 A 8/2018
CN 108600892 A 9/2018
(Continued)

*Primary Examiner* — Eugene Yun
(74) *Attorney, Agent, or Firm* — LKGlobal | Lorenz & Kopf, LLP

(57) ABSTRACT

A communication method between earphones and a charging box is disclosed. The method comprises: acquiring a data packet to be sent from a sending queue; sending a data request message containing the data packet to be sent to the earphones; and when having received a reply message from the earphones, continuing to execute the step of acquiring a data packet to be sent from the sending queue until the sending queue is empty. In the communication method between earphones and a charging box of the present disclosure, when data is transmitted between the charging box and the earphones, the data transmission between the charging box and the earphones can be realized without switching the master-slave relationship between the charging box and the earphones, which is simple to realize and reduces the additional communication burden.

3 Claims, 3 Drawing Sheets

(58) Field of Classification Search
CPC ..... H04L 1/0061; H04L 67/141; H04L 67/34; H04L 67/60; H04W 4/80
USPC ...................................................... 455/41.2
See application file for complete search history.

(56) References Cited

FOREIGN PATENT DOCUMENTS

| | | |
|---|---|---|
| CN | 108769856 A | 11/2018 |
| CN | 111629368 A | 9/2020 |
| EP | 3367582 A1 | 8/2018 |

* cited by examiner

COMMUNICATION METHOD BETWEEN EARPHONES AND CHARGING BOX, CHARGING BOX, EARPHONES AND READABLE STORAGE MEDIUM

CROSS REFERENCE TO RELATED APPLICATIONS

This application is a U.S. National Stage entry under 35 U.S.C. § 371 based on International Application No. PCT/CN2020/124861, filed on Oct. 29, 2020. This application claims priority to Chinese patent application No. 202010428657.3 filed with the China Patent Office on May 19, 2020 and entitled "Communication Method between Earphones and Charging Box, Charging Box, Earphones and Readable Storage Medium". These applications are hereby incorporated herein in their entirety by reference.

TECHNICAL FIELD

This application pertains to the field of communication technology, more particularly, to a communication method between earphones and a charging box, a charging box, earphones and a readable storage medium.

BACKGROUND

With the development of wireless communication technology, TWS (true wireless stereo) Bluetooth earphones are favored by users because of their small size and portability. In general, a TWS earphones product comprises earphones and a charging box, and there is communication between the earphones and the charging box.

At present, when the earphones and the charging box communicate with each other, the charging box sends all the data packets to be sent to the earphones in sequence, and only when the earphones have received a data transmission completion signal sent by the charging box, the earphones sends all the data packets to be sent to the charging box in sequence so as to realize the communication between the earphones and the charging box. However, both when the earphones send a data packet and when the charging box sends a data packet, a notification message must be sent to the receiver in advance to make the receiver be in the receiving data state. This communication method requires the switching of master-slave relationship between the earphones and the charging box; moreover, since the notification message must be sent to the receiver before sending each data packet, the communication burden is increased.

The above content is only used to assist in understanding the technical solutions of the present disclosure, and does not mean that the above content is acknowledged as the prior art. In addition, other objects, desirable features and characteristics will become apparent from the subsequent summary and detailed description, and the appended claims, taken in conjunction with the accompanying drawings and this background.

SUMMARY

The main object of the present disclosure is to provide a communication method between earphones and a charging box, a charging box, earphones and a readable storage medium, which aim to solve the problems that when the earphones and the charging box communicate with each other, the master-slave relationship between the earphones and the charging box must be switched, and that a notification message must be sent to the receiver before sending each data packet, resulting in increasing communication burden.

To achieve the above objects, the present disclosure provides a communication method between earphones and a charging box. The communication method between the earphones and the charging box comprises:

acquiring, by the charging box, a data packet to be sent from a sending queue;

sending a data request message containing the data packet to be sent to the earphones; and when having received a reply message from the earphones, continuing to execute the step of acquiring a data packet to be sent from the sending queue until the sending queue is empty.

Optionally, the communication method between earphones and a charging box further comprises:

when the sending queue is empty, sending a data request message to the earphones until the reply message not containing a data packet returned by the earphones is continuously received.

Optionally, the step of when the sending queue is empty, sending a data request message to the earphones comprises:

when the sending queue is empty, judging whether a last reply message from the earphones contains a data packet;

when the last reply message from the earphones contains a data packet, directly sending the data request message to the earphones; or when the last reply message from the earphones does not contain a data packet, sending a data request message to the earphones after a preset time period.

Optionally, the communication method between earphones and a charging box further comprises:

when having received the reply message from the earphones, verifying the reply message, so that when a verification result is successful, the step of acquiring a data packet to be sent from the sending queue is executed, and when a verification result is failed, the data request message containing the data packet to be sent is resent.

Optionally, the communication method between earphones and a charging box further comprises:

when a number of times of receiving the reply message that does not contain a data packet meets a preset number for switching, switching to a charging state.

To achieve the above objects, the present disclosure also provides a communication method between earphones and a charging box. The communication method between the earphones and the charging box comprises:

when the earphones have received a data request message sent by the charging box, acquiring a data packet from a sending queue; and sending a reply message containing the data packet to the charging box.

Optionally, the communication method between earphones and a charging box further comprises:

when the sending queue is empty, directly sending the reply message to the charging box.

Optionally, before the step of acquiring a data packet to be sent from the sending queue, the communication method between earphones and a charging box further comprises:

when having received the data request message sent by the charging box, verifying the data request message, so that when a verification result is successful, a next data packet is acquired from the sending queue, and when a verification result is failed, the reply message containing the data packet is resent.

Optionally, the communication method between earphones and a charging box further comprises:

when a number of times of receiving the data request message that does not contain a data packet meets a preset number for switching, switching to a charging state.

In addition, in order to achieve the above objects, the present disclosure also provides a charging box. The charging box comprises a memory, a processor and a communication program between earphones and a charging box stored in the memory and operable on the processor. When the communication program between earphones and a charging box is executed by the processor, steps of the communication method between earphones and a charging box as described above are realized.

Optionally, the charging box communicates via a package bottom layer single bus.

In addition, in order to achieve the above objects, the present disclosure also provides an earphone, which comprises a memory, a processor and a communication program between earphones and a charging box stored in the memory and operable on the processor. When the communication program between earphones and a charging box is executed by the processor, steps of the communication method between earphones and a charging box as described above are realized.

In addition, in order to achieve the above objects, the present disclosure also provides a readable storage medium having a communication program between earphones and a charging box stored thereon. When the communication program between earphones and a charging box is executed by a processor, steps of the communication method between earphones and a charging box as described above are realized.

In the communication method between earphones and a charging box proposed in the present disclosure, when data is transmitted between the charging box and the earphones, the charging box is always an active sender (i.e., it actively sends a data request message to the earphones), and the earphones are always a passive receiver, (i.e., after having received the data request message, they returns the reply message to the charging box). The communication between the charging box and the earphones are realized in the form of "one question and one answer", and the data transmission between the charging box and the earphones can be realized without switching the master-slave relationship between the charging box and the earphones, which is simple to realize and reduces the additional communication burden.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It should be understood that the specific embodiments described herein are only used to explain the present disclosure and are not used to limit the present disclosure.

In the subsequent description, suffixes such as "module", "component" or "unit" used to represent elements are used only for facilitating the description of the present disclosure, and have no special meanings themselves. Therefore, "module", "component" or "unit" may be used interchangeably.

Figure 1:
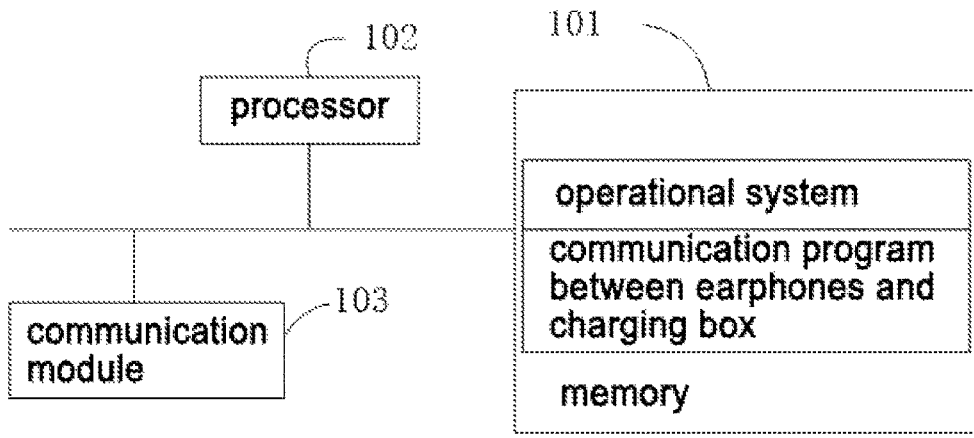
FIG. 1 is a block diagram of the structure of a charging box or earphone involved in various embodiments of the communication method between earphones and a charging box according to the present disclosure.

Please refer to FIG. 1 which is a block diagram of the structure of earphones or a charging box involved in various embodiments of the communication method between earphones and a charging box according to the present disclosure. The earphones or charging box may comprise a memory 101, a processor 102, and a communication module 3. It can be understood by those skilled in the art that the block diagram of the structure of the charging box or earphone shown in FIG. 1 does not constitute a limitation on the charging box or earphones. The charging box or earphones may comprise more or less components than those shown in the FIG. 1, or some components may be combined, or different component arrangements may be used. The memory 101 stores a central control system and a communication program between the earphones and the charging box. The processor 102 is the control center of the charging box or earphones, and executes the communication program between the earphones and the charging box stored in the memory 101 to realize the steps of each embodiment of the communication method between the earphones and the charging box according to the present disclosure. Regarding the charging box, the communication module 3 establishes data communication with the earphones via a network protocol (which may be IP communication or Bluetooth communication), so that the charging box sends a data request message to the earphones and receives a reply message returned by the earphones, thereby realizing the data transmission between the charging box and the earphones.

Optionally, the charging box or earphone communicates via a package bottom layer single bus. It should be noted that the single bus technology uses a single data signal line to transmit both clock and data, and the data transmission is bidirectional, which has many advantages, such as saving I/O port line resources, simple structure, low cost, easy bus expansion and maintenance, etc. For example, the charging box and the earphones are connected by a single data bus, and the serial port data transmission line (TX) and the serial port data receiving line (RX) share the single data bus. Specifically, the charging box and the earphones communicate via the universal asynchronous receiver/transmitter (UART). In an actual application process, when the charging box communicates with the earphones, they actually communicate based on the single bus to realize the two-way communication between the charging box and earphones on the application layer.

It should be noted that when the communication program between earphones and a charging box in the memory 101 of the charging box is executed by the processor 102, the following steps are realized:

acquiring, by the charging box, a data packet to be sent from a sending queue;

sending a data request message containing the data packet to be sent to the earphones; and when having received a reply message from the earphones, continuing to execute the step of acquiring a data packet to be sent from the sending queue until the sending queue is empty.

Or, when the communication program between earphones and a charging box in the memory 101 of the earphones are executed by the processor 102, the following steps are realized:

when the earphones have received a data request message sent by the charging box, acquiring a data packet to be sent from a sending queue; and sending a reply message containing the data packet to be sent to the charging box.

It should be noted that in the process of data transmission between the charging box and the earphones, the charging box is always an active sender and the earphones are always a passive receiver. As long as there is a data packet to be sent in the sending queue in the charging box, the data packet to be sent will be immediately acquired and sent to the earphones. When there is no data packet to be sent in the sending queue in the charging box, a data request message may be actively sent to the earphones to acquire a data packet to be sent in the earphones. Optionally, the data request messages may be actively sent to the earphones at a preset time interval. The application scenarios of data transmission between the charging box and the earphones include at least one of the following: a computer performs data transmission with the earphones via the charging box to upgrade the earphones; a computer performs data transmission with the earphones via the charging box to acquire information of the earphones in the production process (such as operation parameters and operation logs); when a left earphone and a right earphone cannot be matched, a pairing command is sent to the earphones via the charging box to realize the re-pairing of the left earphone and the right earphone; in case of any fault during the use of the earphones, a command for restoring factory settings is sent to the earphones via the charging box to restart the earphones.

Based on the block diagram of the structure of the charging box, a first embodiment or a second embodiment of the communication method between earphones and a charging box according to the present disclosure is proposed.

Figure 2:
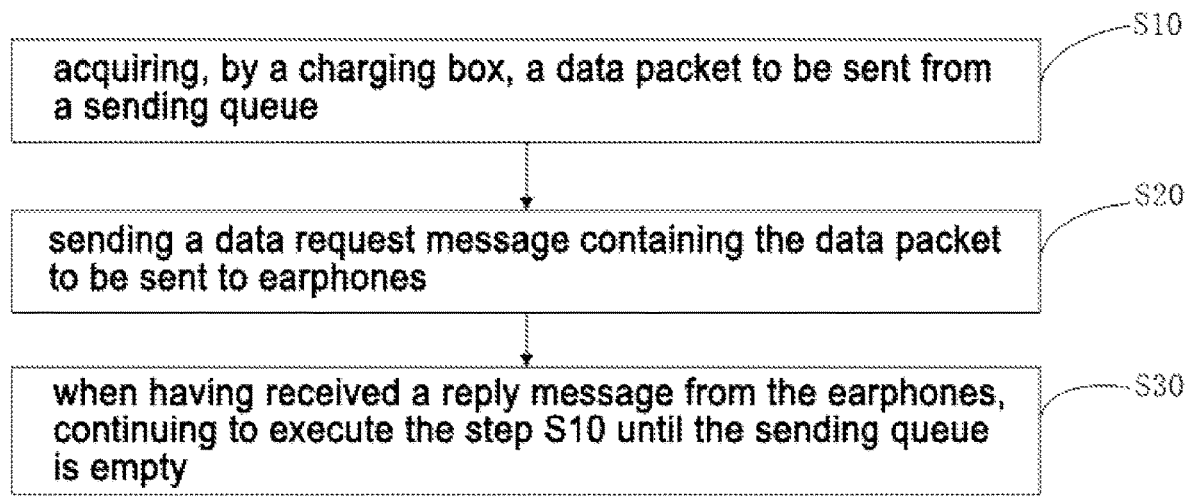
FIG. 2 is a flowchart of a first embodiment of a communication method between earphones and a charging box according to the present disclosure.

The present disclosure provides a communication method between earphones and a charging box. Please refer to FIG. 2, which is a flowchart of the first embodiment of a communication method between earphones and a charging box according to the present disclosure. In this embodiment, the communication method between earphones and a charging box comprises the following steps:

step S10, acquiring, by the charging box, a data packet to be sent from a sending queue;

step S20, sending a data request message containing the data packet to be sent to the earphones; and step S30: when having received a reply message from the earphones, continuing to execute the step S10 until the sending queue is empty.

The sending queue is used to store data packets to be sent in the charging box. The charging box acquires the data packets to be sent from the sending queue, and sends the data packets to the earphones that establish data communication with the charging box. The data packets to be sent are the data to be sent in the charging box. Each data packet to be sent corresponds to a data identification number, which can be used to uniquely determine the data packet to be sent corresponding to the data identification number. For example, a plurality of data to be sent may be divided into one or more data packets to be sent, and by setting a data identification number for the data to be sent, the data to be sent having the same data identification number may be divided as the same data packet to be sent, and the data identification number is used as the unique identifier of the data packet to be sent. It is easy to understand that, each data packet in the plurality of data packets to be sent can be provided with a data identification number according to the sending sequence. The data identification number may be represented by numbers 1, 2, 3 . . . and n. By providing the data identification number, it can be prevented that the data receiver such as the charging box or the earphones repeatedly receives the same packet of data due to timeout or data transmission error during data transmission between the charging box and the earphones. The data request message includes but is not limited to data packets to be sent and verification information. The verification information is used to check whether there is a data transmission error when the charging box sends the data packets to be sent to the earphones. For example, the verification information is a cyclic redundancy verification code (i.e., CRC code). By adding the verification information to the end of the data packet to be sent, a data request message is formed. After the charging box sends the data request message to the earphones, when the earphones have received the data request message, the verification information in the data request message is verified according to a preset verification method to determine whether there is an error in the data transmission between the charging box and the earphones.

Optionally, the data request message further includes data verification information. The data verification information is used to notify the earphones whether it is necessary to resend the data packet. In other words, when having received the reply message containing a data packet sent back by the earphones and then sending the data request message to the earphones, the earphones may judge whether to resend the data packet that has been sent last time based on the data verification information in the data request message. It should be noted that, the data verification information contains a verification flag, which can be used to judge whether the earphones need to resend the data packet. For example, when the charging box has received the reply information containing a data packet sent by the earphones, the charging box verifies the verification information in the reply message. When the obtained verification result agrees with the preset verification information, namely, when the data packet is accurately transmitted, the charging box can notify the earphones to send the data packet to be sent obtained from the sending queue. The verification flag can be marked as "1" to indicate that the data packet is correctly received. Similarly, when the obtained verification result does not agree with the preset verification information, namely, the data packet is mistakenly transmitted, the earphones can be notified to resend the data packet that has been sent last time.

The verification flag can be marked as "0" to indicate that the data packet is mistakenly received, which is not particularly limited. For another example, after the charging box has received the reply message containing a data packet returned by the earphones, the earphones receives the data request message returned by the charging box, and judges whether to resend the data packet that has been sent last time based on the data verification information in the data request message. For example, the data identification number of the data packet returned by the earphones is 8, when the data verification information indicates that the data packet is received correctly, the earphones will be notified to send a reply message containing a data packet corresponding to the data identification number 9; and when the data verification information indicates that the data packet is received mistakenly, the earphones will be notified to resend the reply message containing the data packet corresponding to the data identification number 8.

It should be noted that the reply message includes but is not limited to data packet confirmation information, data packet and verification information. The data packet confirmation information is used to judge whether the charging box needs to resend the data packet. Optionally, the packet confirmation information contains a verification flag. The verification flag can be used to judge whether the charging box needs to resend the data packet. In other words, when the verification flag is marked as "data packet received mistakenly", the data packet that has been sent last time may be resent to the earphones; when the verification flag is marked as "data packet received correctly", the data packet to be sent obtained from the sending queue may be directly sent to the earphones. It should be noted that, regarding the setting of the verification flag, after the earphones have received the data request message from the charging box, the verification information in the data request message is verified using a preset verification method. When the obtained verification result agrees with the preset verification information, that is, when the data packet is accurately transmitted, the verification flag can be marked as "1" to indicate that the data packet is correctly received; similarly, when the obtained verification result does not agree with the preset verification information, that is, the data packet is mistakenly transmitted, the verification flag can be marked as "0" to indicate that the data packet is mistakenly received, which is not particularly limited. The data packet is a data packet to be sent acquired from the sending queue in the earphones. Each data packet corresponds to a data identification number that can uniquely identify the data packet. The concept of this data identification number is similar to the data identification number corresponding to the data packet to be sent in the data request message sent by the charging box, and will not be repeated here. The verification information is used to check whether there is a data transmission error during the process of sending a data packet from the earphones to the charging box.

In an actual application process, during the process of sending the data request message containing the data packet to be sent to the earphones, due to the influence of network environment interference or other unstable factors, the data packet may be damaged or lost, or the data packet received by the earphones may not be the currently required data packet. Therefore, based on the data request message containing the data packet to be sent that is sent by the charging box, the earphones sends a reply message to the charging box, and the charging box determines whether to resend the data packet that has been sent last time by acquiring the data packet confirmation information in the reply message. It should be noted that, in the step S30 of when having received a reply message from the earphones, continuing to execute the step of acquiring a data packet to be sent from the sending queue, the data packet to be sent may be the data packet that has been sent last time, or the data packet to be sent after the data packet that has been sent last time that is obtained according to the transmission sequence. Optionally, when the reply message from the earphones has been received, the reply message is verified, so that when the verification result is successful, the step of acquiring a data packet to be sent from the sending queue is executed, that is, the data packet to be sent after the data packet that has been sent last time is acquired from the sending queue according to the transmission sequence; when the verification result is failed, the data request message containing the data packet to be sent (i.e., the data packet that has been sent last time) is resent. Verifying the reply message is actually acquiring the verification flag of the packet confirmation information in the reply message. When the verification flag is marked as "data packet received correctly", it means that the verification result is successful; when the verification flag is marked as "data packet received mistakenly", it means that the verification result is failed. For example, the charging box sends a data request message containing a data packet to be sent to the earphones, and the data identification number corresponding to the data packet to be sent is 8, when the verification flag in the reply message sent by the earphones is that the data packet is correctly received, a data request message containing a data packet corresponding to the data identification number 9 is sent to the earphones; and when the verification flag in the reply message sent by the earphones is that the data packet is mistakenly received, the data request message containing the data packet corresponding to the data identification number 8 is resent to the earphones. Optionally, the step S10 may be executed when the reply message from the earphones has not been received within a preset time period.

In the technical solution disclosed in this embodiment, when data is transmitted between the charging box and the earphones, the charging box is always an active sender (i.e., it actively sends a data request message to the earphones), the earphones are always a passive receiver, (i.e., after having received the data request message, they returns the reply message to the charging box), the communication between the charging box and the earphones are realized in the form of "one question and one answer", and the data transmission between the charging box and the earphones can be realized without switching the master-slave relationship between the charging box and the earphones, which is simple to realize and reduces the additional communication burden. In addition, the communication between the charging box and the earphones is realized in the form of "one question and one answer", which can facilitate the fault-tolerant processing for the mistakenly transmitted data packets in the process of data transmission to timely acquire accurate data packets. In other words, when the earphones have received the data request message containing the data packet to be sent that is sent by the charging box, the verification information in the data request message is verified, so that when the verification result is data transmission error, a reply message is sent to the charging box to notify the charging box to resend the data packet to be sent. Similarly, when the charging box has received the reply message containing a data packet returned by the earphones, the verification information in the reply message is verified, so that when the verification result is data transmission error, a data request message may be immediately sent to the earphones to notify the earphones to resend the data packet.

Figure 3:
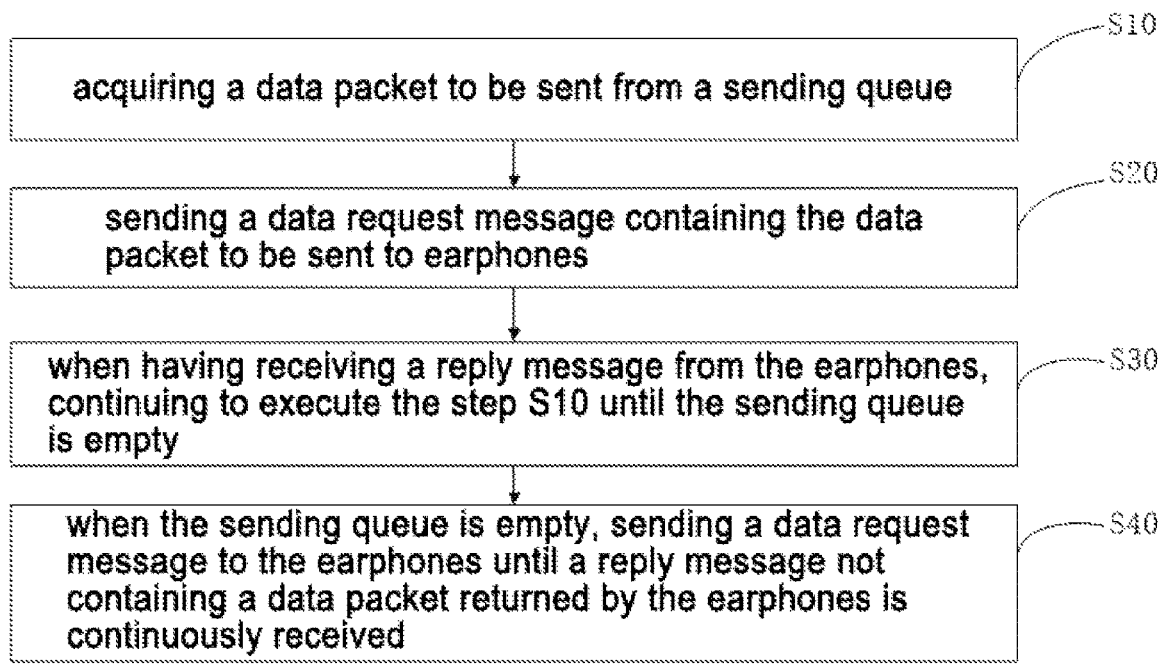
FIG. 3 is a flowchart of a second embodiment of a communication method between earphones and a charging box according to the present disclosure.

Based on the above first embodiment, the second embodiment of the communication method between earphones and a charging box of the present disclosure is proposed. Please refer to FIG. 3, which is a flowchart of a second embodiment of a communication method between earphones and a charging box according to the present disclosure. In this embodiment, the communication method between earphones and a charging box further comprises:

step S40, when the sending queue is empty, sending a data request message to the earphones until the reply message not containing a data packet returned by the earphones is continuously received.

When the sending queue is empty, that is, the charging box has no data packet to be sent, with the charging box being the active sender and the earphones being the passive receiver, the charging box acquires the data packet to be sent in the earphones by sending the data request message to the earphones. When the reply message not containing a data packet returned by the earphones is continuously received, it indicates that there is no data packet to be sent in the earphones, thereby avoiding that the data packet to be sent in the earphones cannot be sent from the application layer to the sending queue of the link layer due to the time delay, resulting in the failure of acquiring the data packet to be sent in the earphones in time. It can be understood that when the sending queue is empty, the way of sending the data request message to the earphones may be directly sending the data request message to the earphones, or sending the data request message to the earphones at a preset time interval, so as to acquire the data packet to be sent in the earphones in time. In addition, continuously receiving the reply message not containing a data packet returned by the earphones may be continuously receiving the reply message not containing a data packet returned by the earphones for a preset number of times, or continuously receiving the reply message not containing a data packet returned by the earphones within a preset time period, or continuously receiving the reply message not containing a data packet returned by the earphones for a preset number of times within a preset time period, which is not limited herein.

Optionally, when the number of times of receiving the reply message that does not contain a data packet meets a preset number for switching, it is switched to the charging state. In a case that the sending queue in the charging box is empty (i.e., there is no data packet to be sent in the charging box), when the reply message from the earphones does not contain a data packet (i.e., there is no data packet to be sent in the sending queue of the earphones), it indicates that there is no data packet to be sent between the charging box and the earphones, the data transmission communication between the charging box and the earphones can be ended, and then the charging box can be switched to the charging state to charge the earphones.

Figure 4:
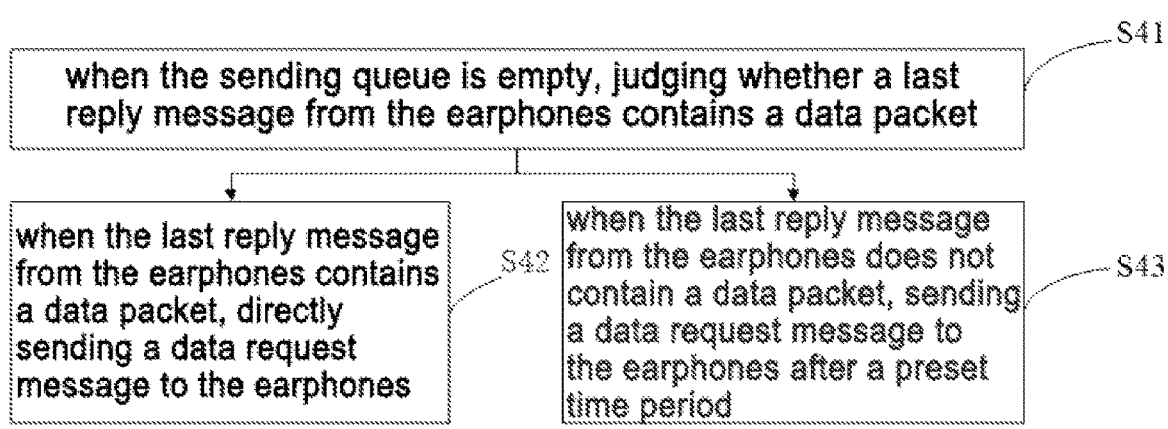
FIG. 4 is a flowchart executed when a sending queue of the charging box is empty in the communication method between earphones and a charging box according to the present disclosure.

Optionally, please refer to FIG. 4, which is a flowchart executed when a sending queue of the charging box is empty in the communication method between earphones and a charging box according to the present disclosure. The step S40 comprises:

step S41: when the sending queue is empty, judging whether the last reply message from the earphones contains a data packet;

step S42: when the last reply message from the earphones contains a data packet, directly sending the data request message to the earphones; or step S43: when the last reply message from the earphones does not contain a data packet, sending a data request message to the earphones after a preset time period.

It should be noted that when the sending queue is empty, that is, there is no data packet to be sent in the charging box, it is further judged whether there is a data packet to be sent in the earphones by judging whether the last reply message from the earphones contains a data packet. When the last reply message from the earphones contains a data packet, that is, it can be considered that there is very likely a data packet to be sent in the earphones, a data request message can be directly sent to the earphones. When the last reply message from the earphones does not contain a data packet, that is, it can be considered that there is very likely no data packet to be sent in the earphones, by sending a data request message to the earphones after a preset time period, it can be avoided that the data packet to be sent in the earphones is not been transmitted from the application layer to the sending queue of the link layer, which results in the failure of acquiring the data packet to be sent in the earphones in time. Optionally, the step S43 comprises: when the last reply message from the earphones does not contain a data packet, after a preset time period, resending the data request message to the earphones at a preset time interval, so as to acquire the data packet to be sent in the earphones in time.

In the technical solution disclosed in this embodiment, when data is transmitted between the charging box and the earphones, the charging box is always the active sender (i.e., it actively sends a data request message to the earphones), the earphones are always the passive receiver, (i.e., after having received the data request message, they returns a reply message to the charging box). When the sending queue of the charging box is empty, that is, there is no data packet to be sent in the charging box, in order to acquire the data packet to be sent in the earphones, the charging box actively sends a data request message to the earphones. For example, the data request message can be actively sent to the earphones at a preset time interval. The data transmission between the charging box and the earphones can be realized without switching the master-slave relationship between the charging box and the earphones, which is simple to realize and reduces the additional communication burden.

Based on the block diagram of the structure of the earphones, a third embodiment of the communication method between earphones and a charging box according to the present disclosure is proposed.

Figure 5:
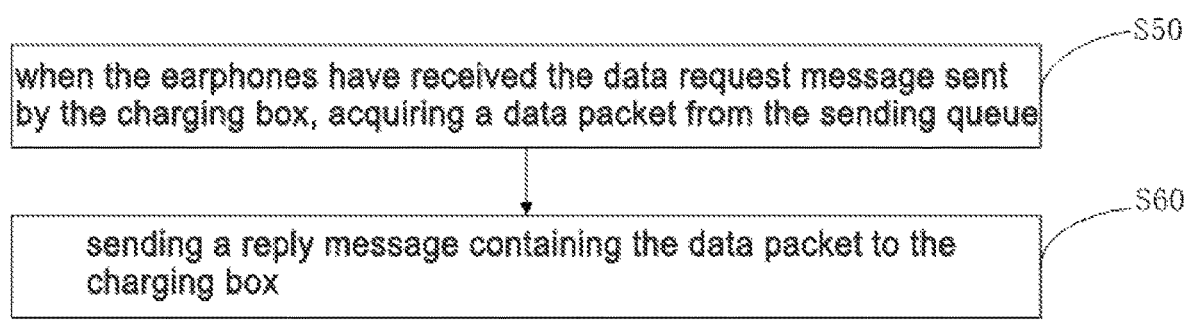
FIG. 5 is a flowchart of a third embodiment of a communication method between earphones and a charging box according to the present disclosure.

The present disclosure also provides a communication method between earphones and a charging box. Please refer to FIG. 5, which is a flowchart of a third embodiment of a communication method between earphones and a charging box according to the present disclosure. In this embodiment, the communication method between earphones and a charging box comprises the following steps:

step S50: when the earphones have received a data request message sent by the charging box, acquiring a data packet from a sending queue; and step S60: sending a reply message containing the data packet to the charging box.

Corresponding to the above first embodiment in which when the charging box is the active sender, the data request message containing a data packet to be sent is sent to the earphones, in this embodiment, the earphones are the passive receiver and receive the data request message sent by the charging box.

It should be noted that the data request message sent by the charging box includes but is not limited to the data packet to be sent and verification information. The sending queue is used to store the data packets to be sent in the earphones. Based on receiving the data request message sent by the charging box, the earphones acquires a data packet to be sent from the sending queue and sends a reply message containing the data packet to be sent to the charging box that establishes data communication with the earphones. The reply message includes but is not limited to data packet confirmation information, the data packet and verification information. The data packet confirmation information is used to inform the charging box whether to resend the data packet. Optionally, the packet confirmation information contains a verification flag. The verification flag can be used to judge whether the charging box needs to resend the data packet. For example, when the earphones have received the data request message containing the data packet to be sent that is sent by the charging box, the earphones verifies the verification information in the data request message. When the obtained verification result agrees with the preset verification information, that is, when the data packet is accurately transmitted, the charging box can be notified to send a data packet to be sent obtained from the sending queue. The verification flag may be marked as "1" to indicate that the data packet is correctly received; similarly, when the obtained verification result does not agree with the preset verification information, that is, the data packet is mistakenly transmitted, the charging box can be notified to resend the data packet that has been sent last time. The verification flag may be marked as "0" to indicate that the data packet is mistakenly received, which is not particularly limited. The data packet is a data packet to be sent acquired from the sending queue in the earphones. Each data packet corresponds to a data identification number that can uniquely identify the data packet. The verification information is used to check whether there is a data transmission error during the process of sending a data packet from the earphones to the charging box.

In an actual application process, during the process of sending a reply message containing a data packet to the charging box, due to the influence of network environment interference or other unstable factors, the data packet may be damaged or lost, or the data packet received by the charging box may not be the currently required data packet. Therefore, based on the reply message containing a data packet sent by the earphones, the charging box sends a data request message to the earphones, and the earphones determine whether to resend the data packet that has been sent last time by acquiring the data packet confirmation information in the data request message. It should be noted that before acquiring a data packet from the sending queue, the step S50 comprises: when having received the data request message sent by the charging box, verifying the data request message so that when the verification result is successful, the next data packet is acquired from the sending queue, that is, the data packet to be sent after the data packet that has been sent last time is acquired from the sending queue according to the transmission sequence; and when the verification result is failed, the reply message containing the data packet (i.e., the reply message containing the data packet that has been sent last time) is resent. Verifying the data request message is actually acquiring the verification flag of the packet confirmation information in the data request message. When the verification flag is marked as "data packet received correctly", it means that the verification result is successful; and when the verification flag is marked as "data packet received mistakenly", it means that the verification result is failed.

Optionally, when the sending queue is empty, a reply message is directly sent to the charging box. When the sending queue is empty, that is, there is no data packet to be sent in the earphones, the reply message may be directly sent to the charging box, and it may be fed back to the charging box based on the data confirmation information in the reply message whether the accurate data packet has been received. It is easy to understand that when the data confirmation information is that the data packet has been received mistakenly, the charging box will be notified to resend the last data packet that has been sent; and when the data confirmation information is that the data packet has been received accurately, the charging box will be notified to send a next data packet to the earphones. The next data packet is a data packet to be sent after the data packet that has been sent last time that is acquired from the sending queue according to the transmission order. For example, when the data identification number corresponding to the last data packet that has been sent is 8, the data identification number corresponding to the next data packet is 9.

Optionally, when the number of times of receiving the data request message that does not contain a data packet meets a preset number for switching, it is switched to the charging state. In a case that the sending queue in the earphones is empty (i.e., there is no data packet to be sent in the earphones), when the data request message from the charging box does not contain a data packet (i.e., there is no data packet to be sent in the sending queue of the charging box), it indicates that there is no data packet to be sent between the charging box and the earphones, the communication between the charging box and the earphones can be ended, and then the earphones can be switched to the charging state to charge the earphones by the charging box.

In the technical solution disclosed in this embodiment, corresponding to the first embodiment above, when data is transmitted between the charging box and the earphones, the charging box is always the active sender (i.e., it actively sends a data request message to the earphones), the earphones are always the passive receiver, (i.e., after receiving the data request message, they returns a reply message to the charging box), the communication between the charging box and the earphones is realized in the form of "one question and one answer", and the data transmission between the charging box and the earphones can be realized without switching the master-slave relationship between the charging box and the earphones, and thus it is simple to realize and reduces the additional communication burden. In addition, the communication between the charging box and the earphones is realized in the form of "one question and one answer", which can facilitate the fault-tolerant processing for the mistakenly transmitted data packets in the process of data transmission to timely acquire accurate data packets. In other words, when the earphones have received the data request message containing the data packet to be sent that is sent by the charging box, the verification information in the data request message is verified, so that when the verification result is data transmission error, a reply message is sent to the charging box to notify the charging box to resend the data packet to be sent. Similarly, when the charging box has received the reply message containing a data packet returned by the earphones, the verification information in the reply message is verified, so that when the verification result is data transmission error, a data request message may be immediately sent to the earphones to notify the earphones to resend the data packet.

The present disclosure also provides a charging box. The charging box comprises a memory, a processor and a communication program between earphones and a charging box stored in the memory and operable on the processor. When the communication program between earphones and a charging box is executed by the processor, the steps of the communication method between earphones and a charging box in the first or second embodiment described above are realized.

The present disclosure also provides earphones. The earphones comprise a memory, a processor and a communication program between the earphones and the charging box stored in the memory and operable on the processor. When the communication program between the earphones and the charging box is executed by the processor, the steps of the communication method between earphones and a charging box in the first or second embodiment described above are realized.

The present disclosure also provides a readable storage medium. The readable storage medium has a communication program between earphones and a charging box stored thereon. When the communication program between earphones and a charging box is executed by a processor, the steps of the communication method between earphones and a charging box in any of the above embodiments are realized.

The embodiments of the charging box, the earphones, and the readable storage medium according to the present disclosure contain all the technical features of the embodiments of the communication method between earphones and a charging box, the expanded and explained contents of the description are substantially the same as the embodiments of the communication method between earphones and a charging box, and will not be repeated here.

It should also be noted that, the terms "comprise", "include" or any other variants are intended to cover non-exclusive inclusion, so that the process, method, article or system including a series of elements may not only include those elements, but may also include other elements not stated explicitly, or elements inherent to the process, method, articles or system. Without more limitations, an element defined by the phrase "comprising a . . . " does not exclude the case that there are other same elements in the process, method, article or system including the element.

The above serial number of the embodiments of the present disclosure is only for description and does not represent the advantages and disadvantages of the embodiments.

Through the above description of the embodiments, those skilled in the art can clearly understand that the above embodiment methods can be implemented by means of software and a necessary general hardware platform. Of course, it can also be implemented by hardware, but in many cases, the former is the better implementation method. Based on this understanding, the technical solution of the present disclosure, in essence or the part that contributes to the prior art, can be embodied in the form of a software product, which is stored on the above storage medium (such as ROM/RAM, magnetic disc, optical disc), and includes instructions to enable a mobile terminal (which may be a mobile phone, a computer, a server, a controlled terminal, or a network device, etc.) to execute the method of each embodiment of the present disclosure.

The above only describes the preferred embodiments of the present disclosure, and does not limit the scope of the patent of the present disclosure. All equivalent substitutions of structure or process made by using the contents of the description and drawings of the present disclosure, or direct or indirect applications in other related technical fields, shall all fall within the scope of protection scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A communication method between earphones and a charging box, comprising:
   when the earphones have received a data request message sent by the charging box, acquiring a data packet from a sending queue; and
   sending a reply message containing the data packet to the charging box; and
   when the sending queue is empty, directly sending the reply message to the charging box,
   wherein before the step of acquiring a data packet to be sent from the sending queue, the method further comprises:
   when having received the data request message sent by the charging box, verifying the data request message, so that when a verification result is successful, acquiring a next data packet from the sending queue, and when a verification result is failed, resenting the reply message containing the data packet.

2. An earphone, comprising a memory, a processor, and a communication program between earphones and a charging box stored in the memory and operable on the processor, wherein when the communication program between earphones and a charging box is executed by the processor, steps of the communication method between earphones and a charging box are realized, wherein the method comprises:
   when the earphones have received a data request message sent by the charging box, acquiring a data packet from a sending queue; and
   sending a reply message containing the data packet to the charging box; and
   when the sending queue is empty, directly sending the reply message to the charging box,
   wherein before the step of acquiring a data packet to be sent from the sending queue, the method further comprises:
   when having received the data request message sent by the charging box, verifying the data request message, so that when a verification result is successful, acquiring a next data packet from the sending queue, and when a verification result is failed, resenting the reply message containing the data packet.

3. A communication method between earphones and a charging box, comprising:
   when the earphones have received a data request message sent by the charging box, acquiring a data packet from a sending queue; and
   sending a reply message containing the data packet to the charging box; and
   when the sending queue is empty, directly sending the reply message to the charging box, when a number of times of receiving the data request message that does not contain a data packet meets a preset number for switching, switching to a charging state.

* * * * *